Oct. 19, 1943.   G. W. HARDMAN   2,332,378
AIRCRAFT ARMAMENT
Filed May 14, 1941   2 Sheets-Sheet 1
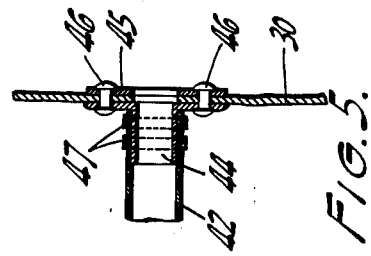
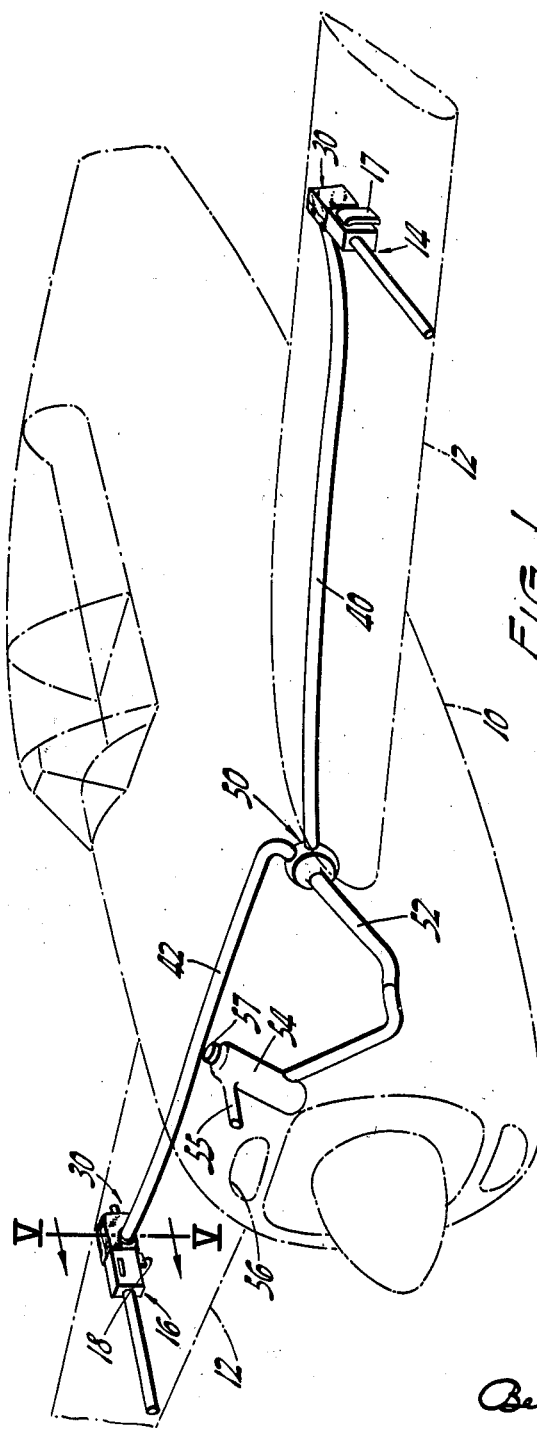
INVENTOR
George W. Hardman
BY
Beau, Brooks, Buckley & Bean.
ATTORNEYS

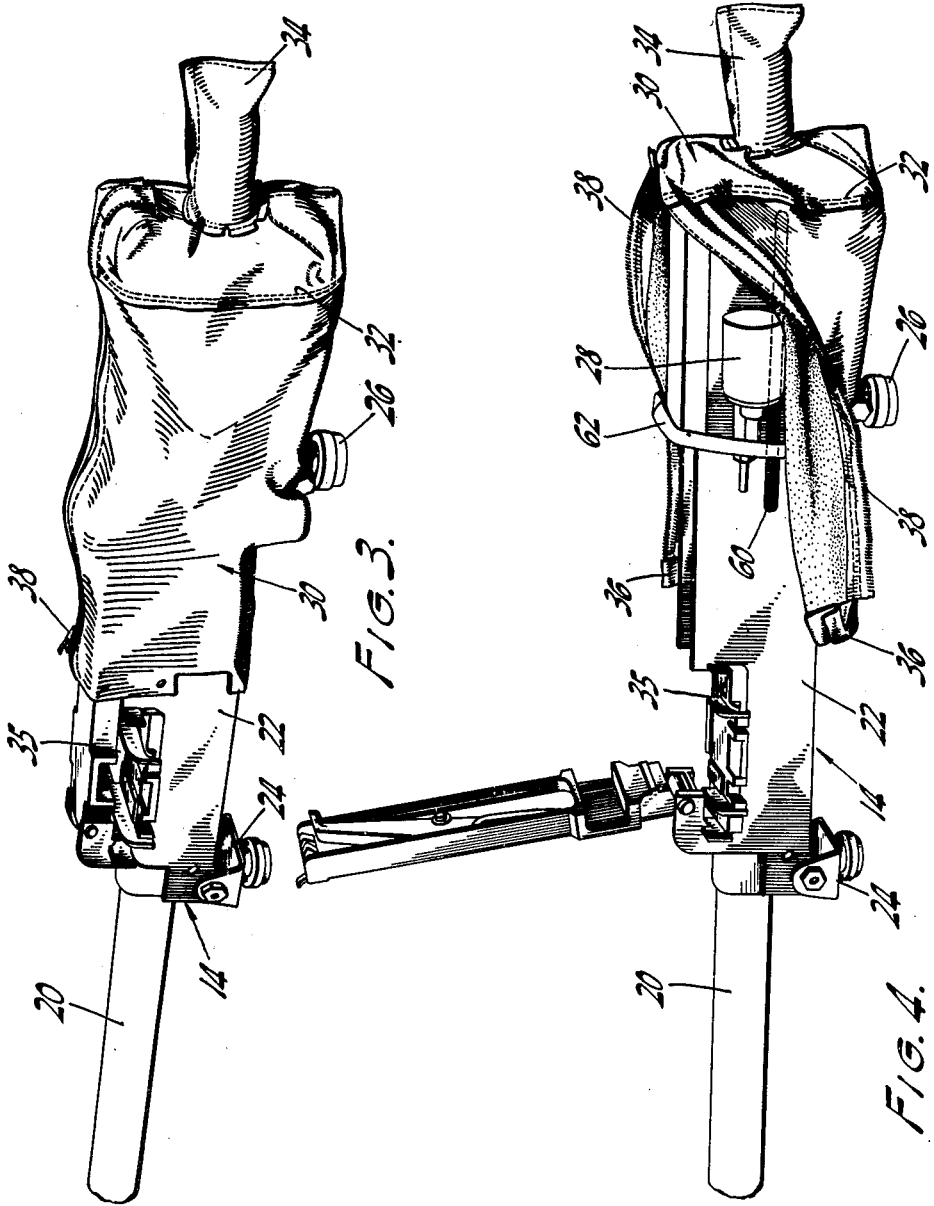

Patented Oct. 19, 1943

2,332,378

UNITED STATES PATENT OFFICE 2,332,378

AIRCRAFT ARMAMENT

George W. Hardman, Garden City, N. Y., assignor to Brewster Aeronautical Corporation, Long Island City, N. Y.

Application May 14, 1941, Serial No. 393,357

8 Claims. (Cl. 89—1)

This invention relates to aircraft, and more particularly to combat aircraft and the armament thereof.

Recent improvements in aircraft of the airplane type have made possible flight for combat purposes at altitudes wherein normal air temperatures are substantially below the normal air temperatures experienced near sea level. For example, it is now usual for modern combat airplanes to operate at altitudes up to thirty thousand feet above sea level, or higher, and the temperature of the outside air at such elevations is often as low as minus 50° centigrade, or lower.

Another recent development in connection with combat aircraft design involves the use of multiple machine guns and/or cannon, and the mounting of such guns within the airplane wing structures. Such wing-mounted guns are disposed beyond reach of the heating effects of the aircraft engine such as tend to maintain fuselage-mounted guns in heated condition during flight, and it has been found that the cooling effects of the surrounding atmosphere upon the wing-mounted guns tends to cause the gun lubricant substances to congeal with result that slowing or complete stoppage of the gun firing operation is experienced.

One of the objects of the present invention is to provide improved aircraft for combat purposes capable of sustained full gun firing power at high altitudes. Another object of the invention is to provide improved armament for aircraft. Another object of the invention is to provide an improved mechanism for maintaining the operating parts of aerial guns at satisfactory operating temperatures during flight through atmospheres of sub-gun-operating temperatures. Other objects and advantages of the invention will appear from the specification hereinafter.

In the drawings:

Fig. 1 is a fragmentary diagrammatic view in perspective of an installation of a pair of aerial guns in opposite wing panels of an airplane, and a gun heating mechanism of the invention;

Fig. 2 is a side elevation of one of the guns of Fig. 1, showing the form and arrangement of the empty cartridge case and link chutes of the gun relative to the adjacent wing profile;

Fig. 3 is a perspective of one of the guns of Fig. 1, on an enlarged scale, with a heating jacket element of the mechanism of the invention installed thereon;

Fig. 4 is a view similar to Fig. 3 showing the gun heating jacket element thereof in opened condition, as during a gun servicing operation; and Fig. 5 is a fragmentary section taken along line V—V of Fig. 1.

The drawings illustrate the invention in conjunction with an airplane having a fuselage indicated at 10 and a pair of oppositely extending wings 12 within which are mounted corresponding left hand and right hand machine guns 14 and 16 respectively. As illustrated in Fig. 2, the guns are each provided with customary type link ejection chutes 17 and empty cartridge case ejection chutes 18 which extend from the corresponding case and link ejection ports of the guns and downwardly through the wing structures for discharge into the airstreams below the wings.

It will be understood that the present invention is adapted for use in connection with any type of aerial gun, but the invention is exemplified in the drawings in connection with standard type machine guns each comprising a gun barrel 20 and a casing 22 containing the usual gun feed pawl and breech and bolt and ejection mechanisms. More specifically, the guns illustrated herein are arranged to be mounted upon the airplane wing structures by means of mounting brackets 24 and 26, and an electrically operated gun trigger control solenoid 28 is illustrated in Fig. 4 as being mounted in operative position against the gun casing. It will be understood that it is contemplated that the guns 14 and 16 are to be mounted in fixed relation upon the airplane wing structures so as to be substantially enclosed therewithin and to be adapted to shoot through suitable ports in the leading edges of the wings; and that the mounting connections for the guns will be provided in conjunction with any suitable bracket devices (not shown) connected to the wing spar or rib elements, as may be preferred. Detachable cover plate portions may be provided in conjunction with the wing covering elements for ease of access into the gun carrying compartments of the wings for gun servicing purposes.

It will be understood that under flight conditions the surrounding airstreams impinge against the wing covering surfaces with such forces as to cause seepage of outside air through the joints in the covering and into the interior of the wings. Thus, under high altitude flight conditions the air filtering into the wings will be normally of such low temperature as to be capable of causing the viscosity of the gun breech and bolt and recoil mechanism lubricant to be so great as to either retard the rate of the gun firing operation or to cause complete stoppage thereof. In accord with the present invention a heating jacket 30 is arranged to substantially enclose the bolt and breech mechanism containing portions of the casing 22 of each of the guns 14—16 in loosely enveloping relation. The jackets 30 are illustrated as being formed of suitable sheet material such as leather, so shaped and fabricated by means of stitching as at 32 as to compactly envelope the entire rear end portions of the guns. The jackets 30 may be provided with accessory portions adapted to envelope protuberances of the gun mechanism so as to provide a substantially complete enclosure of the operating portions of the gun. For example, an accessory envelope portion 34 may be arranged to extend, as illustrated, from the rear end of the jacket 30 so as to encompass the buffer mechanism of the gun illustrated. Thus, the jacket is arranged to substantially envelop the gun in the region of the bolt and breech mechanisms thereof, but the jacket may be terminated at its forward end just aft of the cartridge feedway portion 35 of the gun so as to avoid interference with the movement of the cartridge belt into the gun (Fig. 3).

The jackets 30 may be provided with binding strips 36 at their forward end portions for reinforcement thereof, and it is preferred that the binding strips 36 be of elastic material arranged to be stretched when the jacket is installed upon the gun so that the juncture between the forward end of the jacket 30 and the gun casing 22 is substantially airtight. Or, the forward end portion of the jackets may be provided with puckering strings, or any other suitable means for providing quickly detachable and tight connections between the forward ends of the jackets and the gun casings 22. Thus, the jackets 30 are in the form of open-mouthed sacks which are adapted to be conveniently slipped over the rear end portions of the gun casings and subsequently fixed thereto at the open-mouth end portions of the jackets by means of the attachment strings or other sealing devices, whereby removal and remounting of the jackets upon the guns in connection with gun servicing operations may be conveniently effected. Also, the jackets 30 are preferably provided with some suitable form of quick-detachable closure mechanism, such as the zipper device illustrated at 38. Thus, it will be understood that the jackets 30, being of pliable material and adapted to conform closely to the gun casings, may be readily installed in operative position upon the guns without requiring provision of extra space within the gun carrying compartments of the airplane wings.

Heat conduits 40 and 42 are arranged to lead into open communication with the interiors of the jackets 30 of the guns 14 and 16, respectively, for transmission of heated air thereinto. As illustrated in Fig. 5, each of the connections between the jackets 30 and the conduits 40—42 may be arranged by means of a flanged nipple 44 which is fixed to a side wall portion of the jacket 30 by means of a fastening ring 45 and suitable fasteners 46. The conduits 40—42 are fixed to the nipples 44 by means of clamping bands 47.

The conduits 40—42 connect at their opposite ends into a valve device 50 which includes an inlet conduit 52 arranged to take heated air from within a muff-type heater 54 having a fresh air intake 55 arranged in communication with an air inlet port 56 through a front wall portion of the airplane engine cowling. The muff heater 54 includes a heating gas conduit 57 which may constitute a portion of the airplane engine exhaust gas manifold. The control valve 50 is arranged to be adjusted by manual manipulation of a suitably connected control device (not shown) by the airplane pilot so that heated air from the muff 54 may be forced by the airstream ramming action at the cowl inlet port 56 into either one or both of the gun jackets 30; and whenever no heating of the guns is required the valve 50 may be adjusted to cut off the supply of heated air to both guns. Thus, it will be understood that the mechanism of the invention provides an arrangement whereby the ramming action of the airstream impinging against the forward end of the airplane during flight will force heated air to move into the jackets 30 surrounding the bolt and breech mechanism of the wing mounted guns, and that thereby the heated air will be forced through openings in the gun casing walls such as the charging slide openings as indicated at 60 (Fig. 4) under the jackets 30 and thence through the interiors of the gun casings so as to flood the gun operating parts with heated air; the heated air being finally discharged through the link ejection chute 18 and/or the empty case chute 17 into the outside atmosphere. A spacer 62 is preferably arranged to extend around the gun casing under the jacket 30 in the region of projecting portions of the gun charging and gun firing mechanisms so as to prevent the jackets 30 from interfering with operation of the enclosed mechanisms.

Preferably, as illustrated in Fig. 2, the projecting end portions of the case and link chutes 17—18 will be so shaped as to avoid airstream ramming actions inwardly of the chutes, and to provide induction of down drafts within the chutes so as to assist the circulation of heated air through the gun operating parts as explained hereinabove. Thus, it will be understood that flight operation of the airplane automatically induces positive circulation of air through the inlet port 56 and over the heated conduit 57 of the engine exhaust manifold, and thence through the conduits 40—42 into the jackets 30, and then through the gun interiors and out of the case and link ejection chutes into the airstream below the airplane wings; and that thus a positive heating of the gun operating parts will be assured through use of a simple and rugged mechanism whereby the gun lubricant substances will be maintained at elevated temperatures so as to avoid congealing thereof, in an improved manner. It will also be understood that the invention functions through use of otherwise waste heat developed by the airplane engine operation, and that by reason of the structural and functional features of the invention most effective employment of the available heating air is accomplished, and that the available heat is transferred directly to the gun parts requiring heating for the purpose described in an improved manner.

Although only one form of the invention has been shown and described in detail, it will be apparent to those skilled in the art that the invention is not so limited but that various changes may be made therein without departing from the spirit of the invention or the scope of the appended claims.

What is claimed is:

1. In combination, an aircraft including a heat producing device, a gun mounted upon said aircraft at a position exposed to the atmosphere surrounding the aircraft under flight conditions, said gun including an elongate casing enclosing at one of its ends ammunition feeding and spent ammunition parts ejecting mechanisms and at the other of its ends ammunition charging and firing mechanisms, said casing having an opening therethrough at said charging and firing mechanism end portion thereof and other openings therethrough at said ammunition feeding and ejecting end portion thereof, a gun heating jacket generally conforming to and loosely fitted about said ammunition charging and firing mechanism end portion of said casing and terminating intermediately of said end portions thereof and tightly clamped thereat in substantially air tight relation thereon, conduit means arranged to convey fluid heated by contact with said heat producing device into the interior of said jacket, and heated fluid outlet conduit means arranged in communication with one of said other openings and projecting from said gun casing so as to clear said jacket for discharge of said heated fluid after passage thereof from the interior of said jacket through said first mentioned casing opening and the interior of said gun casing while in intimate contact with said gun charging and firing mechanisms, said outlet conduit being projected to extend into the airstream exteriorly of said aircraft and directed relative to said airstream so that flow of discharging heated fluid outwardly of said outlet conduit will be induced by the movement of said airstream.

2. In combination, an aircraft including a heat producing device, a gun mounted upon said aircraft at a position exposed to the atmosphere surrounding the aircraft under flight conditions, said gun including an elongate casing enclosing at one of its ends ammunition feeding and spent ammunition parts ejecting mechanisms and at the other of its ends ammunition charging and firing mechanisms, said casing having an opening therethrough at said charging and firing mechanism end portion thereof and other openings therethrough at said ammunition feeding and ejecting end portion thereof, a gun heating jacket generally conforming to and loosely fitted about said ammunition charging and firing mechanism end portion of said casing and terminating intermediately of said end portions thereof and tightly clamped thereat in substantially air tight relation thereon, conduit means arranged to convey fluid heated by contact with said heat producing device into the interior of said jacket, and an outlet conduit arranged in communication with one of said other openings and projecting from said gun casing so as to clear said jacket for simultaneous discharge of ejected ammunition parts and gun heating fluid after passage thereof from the interior of said jacket through said first mentioned casing opening and the interior of said gun casing.

3. A heating jacket for a machine gun having a casing portion containing ammunition feeding and spent ammunition parts ejecting mechanisms within one of its end portions and ammunition charging and firing mechanism within the other of its end portions, said jacket comprising a housing generally loosely fitted over said ammunition charging and firing mechanism end portion of said casing and conforming closely to the shape thereof, said jacket terminating intermediately of said casing end portions and clamped thereat upon said casing in substantially air tight relation without interfering with the operation of said ammunition feeding and ejecting mechanisms, and heating air supply means arranged in communication with the interior of said jacket for feeding heated air thereinto.

4. A heating jacket for a machine gun having a casing portion containing ammunition feeding and spent ammunition parts ejecting mechanisms within one of its end portions and ammunition charging and firing mechanism within the other of its end portions, said jacket comprising a housing of a flexible material generally loosely fitted over said ammunition charging and firing mechanism end portion of said casing and conforming closely to the shape thereof, said jacket terminating intermediately of said casing end portions and clamped thereat upon said casing in substantially air tight relation without interfering with the operation of said ammunition feeding and ejecting mechanisms, and heating air supply means arranged in communication with the interior of said jacket for feeding heated air thereinto.

5. A heating jacket for a machine gun having a casing portion containing ammunition feeding and spent ammunition parts ejecting mechanisms within one of its end portions and ammunition charging and firing mechanism within the other of its end portions, said jacket comprising a housing of flexible material and of sack-like form generally loosely fitted over said ammunition charging and firing mechanism end portion of said casing and conforming closely to the shape thereof, said jacket terminating intermediately of said casing end portions and clamped thereat upon said casing in substantially air tight relation without interfering with the operation of said ammunition feeding and ejecting mechanisms, and heating air supply means arranged in communication with the interior of said jacket for feeding heated air thereinto.

6. In combination, an aircraft including a heat producing device, a plurality of guns mounted upon said aircraft at positions exposed to the atmosphere surrounding the aircraft under flight conditions, said guns each including an elongate casing enclosing at one of its ends ammunition feeding and spent ammunition parts ejecting mechanisms and at the other of its ends ammunition charging and firing mechanisms, said casing having an opening therethrough at said charging and firing mechanism end portion thereof and other openings therethrough at said ammunition feeding and ejecting end portion thereof, a gun heating jacket generally conforming to and loosely fitted about said ammunition charging and firing mechanism end portion of said casing portion of each of said guns and terminating intermediately of said end portions thereof and tightly clamped thereat in substantially air tight relation thereon, multiple conduit means arranged to convey fluid heated by contact with said heat producing device into the interior of each of said jackets, and valve means associated with said conduit means for manual adjustment to provide selective distribution of heating fluid to said guns.

7. In combination, an aircraft including a heat producing device, a gun mounted upon said aircraft at a position exposed to the atmosphere surrounding the aircraft under flight conditions, said gun including an elongate casing enclosing at one of its ends ammunition feeding and spent ammunition parts ejecting mechanisms and at the other of its ends ammunition charging and firing mechanisms, said casing having an opening therethrough at said charging and firing mechanism end portion thereof and other openings therethrough at said ammunition feeding and ejecting end portion thereof, a gun heating jacket generally conforming to and loosely fitted about said ammunition charging and firing mechanism end portion of said casing and terminating intermediately of said end portions thereof and tightly clamped thereat in substantially air tight relation thereon, conduit means opening into the airstream externally of said aircraft to receive and to convey air into heat exchange contact with said heat producing device and then into the interior of said jacket for transmission through the interior of said gun casing.

8. In combination, an aircraft including a heat producing device, a gun mounted upon said aircraft at a position exposed to the atmosphere surrounding the aircraft under flight conditions, said gun including an elongate casing enclosing at one of its ends ammunition feeding and spent ammunition parts ejecting mechanisms and at the other of its ends ammunition charging and firing mechanisms, said casing having an opening therethrough at said charging and firing mechanism end portion thereof and other openings therethrough at said ammunition feeding and ejecting end portion thereof, a gun heating jacket generally conforming to and loosely fitted about said ammunition charging and firing mechanism end portion of said casing and terminating intermediately of said end portions thereof and tightly clamped thereat in substantially air tight relation thereon, conduit means arranged to convey fluid heated by contact with said heat producing device into the interior of said jacket, and ejected parts discharge chute means arranged in communication with one of said other openings and projecting from said gun casing so as to clear said jacket for discharge of ejected ammunition parts and said heated fluid after passage thereof from the interior of said jacket through said first mentioned casing opening and the interior of said gun casing while in intimate contact with said gun charging and firing mechanisms, said chute means being projected to extend into the airstream exteriorly of said aircraft and directed relative to said airstream so that flow of discharging heated fluid outwardly of said outlet conduit will be induced by the movement of said airstream.

GEORGE W. HARDMAN.